(12) United States Patent
Guillez et al.

(10) Patent No.: US 6,976,725 B2
(45) Date of Patent: Dec. 20, 2005

(54) MOTOR VEHICLE RETRACTABLE ROOF AND IN PARTICULAR PICK-UP EQUIPPED WITH SAME

(75) Inventors: Jean-Marc Guillez, Cirieres (FR); Gérard Queveau, Le Pin (FR)

(73) Assignee: France Design, Le Pin (FR)

( * ) Notice: Subject to any disclaimer, the term of this patent is extended or adjusted under 35 U.S.C. 154(b) by 0 days.

(21) Appl. No.: 10/398,112

(22) PCT Filed: Sep. 28, 2001

(86) PCT No.: PCT/FR01/03019

§ 371 (c)(1),
(2), (4) Date: Sep. 22, 2003

(87) PCT Pub. No.: WO02/26512

PCT Pub. Date: Apr. 4, 2002

(65) Prior Publication Data

US 2004/0056507 A1    Mar. 25, 2004

(30) Foreign Application Priority Data

Sep. 28, 2000  (FR) .................................. 00 12367

(51) Int. Cl.[7] .............................................. B60J 7/00
(52) U.S. Cl. .................................. 296/107.17; 296/108
(58) Field of Search .......................... 296/100.17, 108, 296/223, 217, 221, 107.08, 216.03, 107.18, 296/214, 219

(56) References Cited

U.S. PATENT DOCUMENTS

| | | | | |
|---|---|---|---|---|
| 5,209,544 A | * | 5/1993 | Benedetto et al. ..... | 296/107.18 |
| 5,265,930 A | * | 11/1993 | Klein et al. ............ | 296/107.17 |
| 5,746,470 A | * | 5/1998 | Seel et al. .............. | 296/108 |
| 5,769,483 A | * | 6/1998 | Danzl et al. ........... | 296/107.08 |
| 6,053,560 A | * | 4/2000 | Rothe .................... | 296/107.17 |
| 6,299,234 B1 | * | 10/2001 | Seel et al. .............. | 296/107.17 |
| 6,467,832 B2 | * | 10/2002 | Schutt et al. .......... | 296/107.17 |
| 6,497,446 B2 | * | 12/2002 | Obendiek .............. | 296/107.17 |
| 6,502,892 B2 | * | 1/2003 | Eberle .................... | 296/107.17 |
| 6,572,175 B2 | * | 6/2003 | Schutt et al. .......... | 296/107.17 |
| 6,648,397 B2 | * | 11/2003 | Schutt et al. .......... | 296/107.17 |
| 6,676,191 B2 | * | 1/2004 | Hasselgruber et al. . | 296/107.17 |
| 6,679,539 B2 | * | 1/2004 | Guillez et al. ......... | 296/107.17 |
| 2001/0045759 A1 | * | 11/2001 | Russke .................. | 296/107.17 |

(Continued)

Primary Examiner—Kiran B. Patel
(74) Attorney, Agent, or Firm—Nawrocki, Rooney & Sivertson, P.A.

(57) ABSTRACT

A retractable roof for a vehicle, comprising a rigid front roof element and a rigid rear roof element having a rear window, said elements being movable between a position in which these elements extend above the passenger compartment of the vehicle, and a position in which said elements are folded one on top of the other in the rear luggage compartment of the vehicle, wherein the front element is fixed so as to be articulated with the rear element along a first axis contained between the adjacent edges of the two elements and situated substantially in the continuation of their lower surface, the rear element fixed so as to be articulated with the bodywork along a second axis close to the lower rear edge of this rear element, the movement of the two roof elements between the aforementioned two positions being controlled by a pivoting arm, the front end of which is fixed so as to be articulated with the front element along a third axis situated in front of the first axis, the rear end of said control arm being fixed so as to be articulated with the bodywork along a fourth axis situated in front of the second axis, the aforementioned four axes defining a deformable quadrilateral, the rear window being movable between a first substantially horizontal position when the roof is closed, a second substantially vertical position, folded down towards the passenger compartment, and a third position under the front element when the roof is stored in the rear luggage compartment.

7 Claims, 3 Drawing Sheets

U.S. PATENT DOCUMENTS

| | | | |
|---|---|---|---|
| 2002/0030381 A1 * | 3/2002 | Schutt et al. | 296/108 |
| 2002/0074832 A1 * | 6/2002 | Schutt et al. | 296/220.01 |
| 2002/0125733 A1 * | 9/2002 | Kinnanen | 296/107.17 |
| 2003/0042751 A1 * | 3/2003 | Antreich | 296/107.17 |
| 2003/0085587 A1 * | 5/2003 | Reinsch | 296/107.17 |
| 2003/0189356 A1 * | 10/2003 | Hasselgruber et al. | 296/107.17 |
| 2004/0051341 A1 * | 3/2004 | Willard | 296/107.17 |
| 2004/0174039 A1 * | 9/2004 | Dilluvio | 296/107.17 |

* cited by examiner

MOTOR VEHICLE RETRACTABLE ROOF AND IN PARTICULAR PICK-UP EQUIPPED WITH SAME

Motor vehicle retractable roof and in particular pick-up equipped with same

The present invention concerns a rigid retractable roof for any type of vehicle.

The invention relates in particular, but is not limited to, a pick-up type vehicle equipped with a retractable roof, this vehicle being convertible into a saloon, a two- or four-seater coupé and a two- or four-seater cabriolet.

Many retractable roofs are known consisting of rigid elements making it possible to convert a vehicle of the coupé type into a vehicle of the cabriolet type.

There is known, for example, a retractable roof for a vehicle, comprising a rigid front roof element and a rigid rear roof element having a rear window, these front and rear elements being movable between a position in which these elements extend above the passenger compartment of the vehicle, and a position in which these elements are folded one on top of the other in the rear luggage compartment of the vehicle.

A first aim of the present invention is to create a novel implementation of a retractable roof adaptable to any type of vehicle and occupying a minimum space in the position of storage inside the rear luggage compartment of the vehicle.

Another aim of the invention is to create a vehicle equipped with the above retractable roof capable of being converted into a number of versions.

According to the invention, the vehicle retractable roof is characterised in that the front element is fixed so as to be articulated with the rear element along a first axis contained between the adjacent edges of the two elements and situated substantially in the continuation of their lower surface, the rear element is fixed so as to be articulated with the bodywork along a second axis close to the lower rear edge of this rear element, the movement of the two roof elements between the aforementioned two positions being controlled by a pivoting arm, the front end of which is fixed so as to be articulated with the front element along a third axis situated in front of the first axis, the rear end of said control arm being fixed so as to be articulated with the bodywork along a fourth axis situated in front of the second axis, the aforementioned four axes defining a deformable quadrilateral, the rear window being movable between a first substantially horizontal position when the roof is closed, a second substantially vertical position, folded down towards the passenger compartment, and a third position under the front element when the roof is stored in the rear luggage compartment.

According to another aspect, the invention concerns a vehicle equipped with a retractable roof in accordance with the invention, this vehicle being of the pick-up type comprising a front cab and a rear open body, this cab having front seats and a rear bench seat that can be folded down, the roof being movable between the following positions:

a first position in which the rear and front elements completely cover the front cab, the latter then being able to give cover to passengers in the front and in the rear;

a second position in which the rear and front elements are stored in the rear open body, the front cab then being totally uncovered;

a third position in which the rear bench seat is folded down towards the front in the continuation of the floor of the rear open body in order to extend this, and the front element covers the front part of the cab, the rear element is stored in the rear open body, the window of the rear element is folded downwards and towards the front seats in order to close off the rear of the cab.

Other specific features and advantages of the invention will emerge further in the description below.

In the accompanying drawings, given by way of non-limitative examples:

Figure 1:
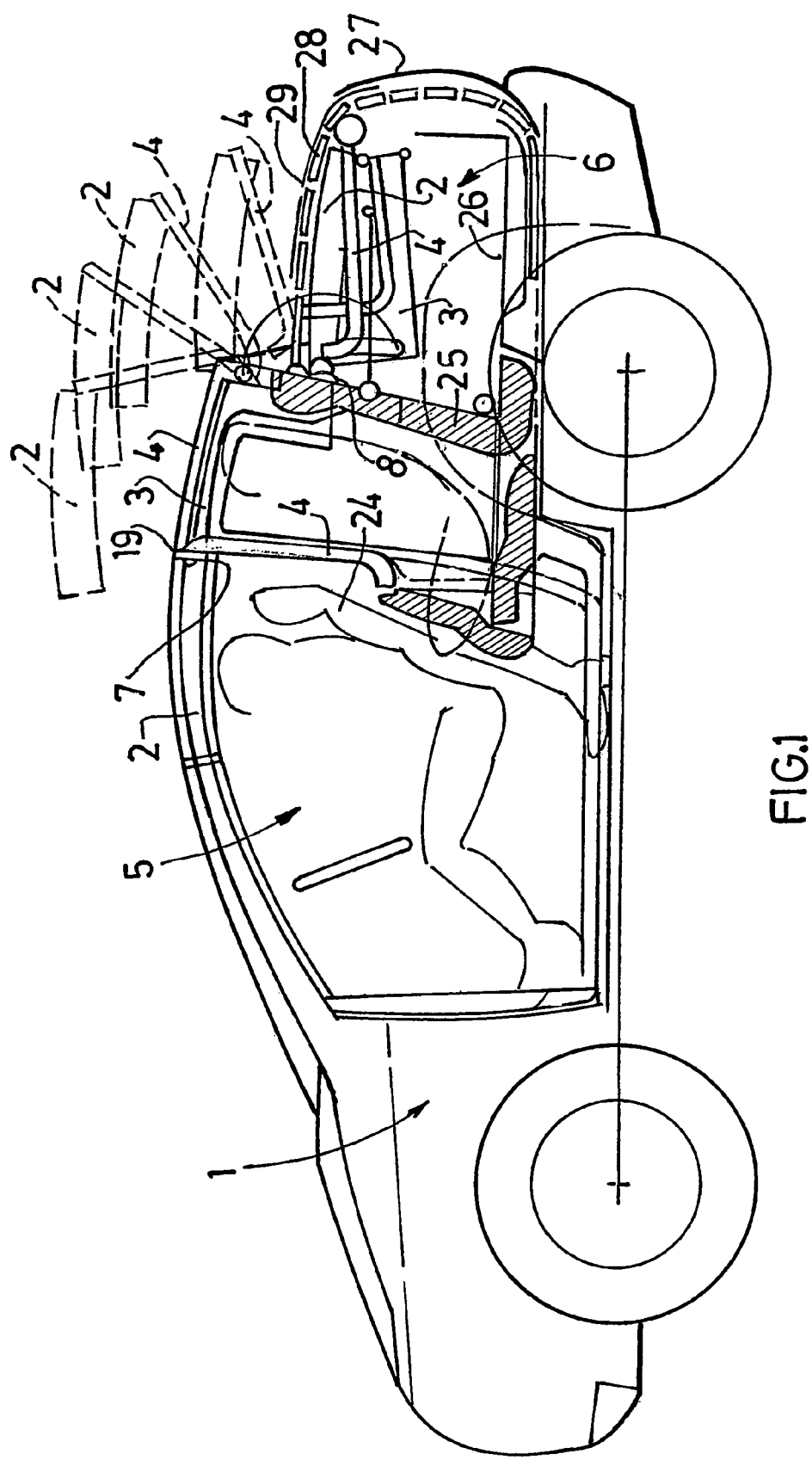
FIG. 1 is a partial longitudinal sectional view of the vehicle according to the invention, equipped with a retractable roof.
Figure 2:
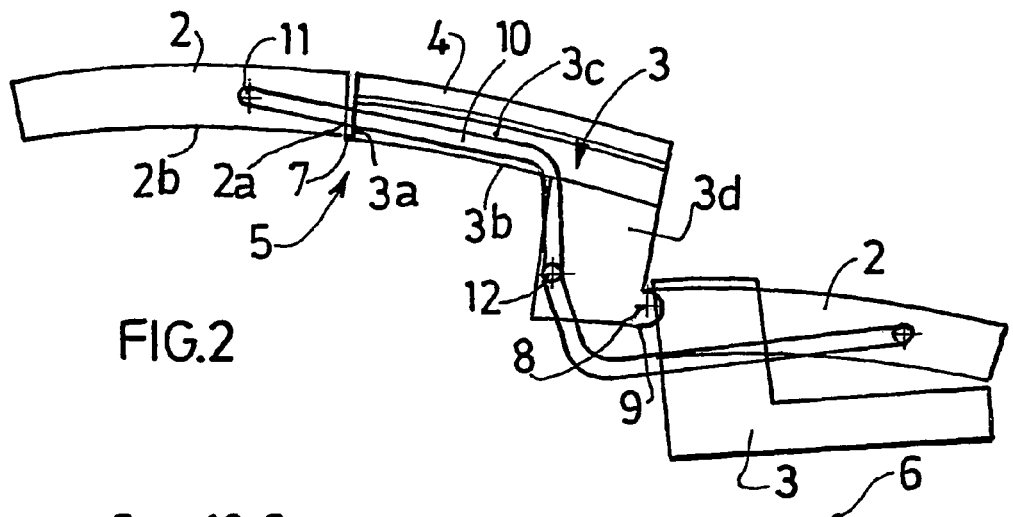
FIG. 2 is a schematic view of the retractable roof according to the invention in its two extreme positions.

In the embodiment depicted in FIGS. 1 and 2, the retractable roof of the vehicle 1 comprises a rigid front roof element (2) and a rigid rear roof element (3) having a rear window (4).

These front and rear elements (2, 3) are movable between a position in which these elements (2, 3) extend above the passenger compartment (5) of the vehicle (1) and a position in which these elements (2, 3) are folded one on top of the other in the rear luggage compartment (6) of the vehicle.

In accordance with the invention, the front element (2) is fixed so as to be articulated with the rear element (3) along a first axis (7) (see FIG. 2) contained between the adjacent edges (2a, 3a) of the two elements (2, 3) and situated substantially in the continuation of their lower surface (2b, 3b).

The rear element (3) is fixed so as to be articulated with the bodywork along a second axis (8) close to the lower rear edge (9) of this rear element (3).

The movement of the two roof elements (2, 3) between the aforementioned two positions is controlled by a pivoting arm (10), the front end of which is fixed so as to be articulated with the front element (2) along a third axis (11) situated in front of the first axis (7).

The rear end of the control arm (10) is fixed so as to be articulated with the bodywork along a fourth axis (12) situated in front of the second axis (8).

The aforementioned four axes (7, 11, 12, 8) define a deformable quadrilateral.

The pivoting of the arm (10) is controlled by means such as an actuator or a motor, allowing this arm (10) to swing towards the rear through an angle close to 180°. In the example depicted in FIGS. 1 and 2, this angle is approximately 165°.

As shown by FIGS. 1 and 2, in the position of storage in the rear luggage compartment (6), the front element (2) extends substantially horizontally above the rear element (3).

The latter is folded under the front element (2) by rotation through an angle close to 180° around the first axis (7).

In the example depicted, the rear element (3) has a lateral profile in the shape of an elbow, one part (3c) of which is situated in the continuation of the front element (2) and the other part (3d) of which extends downwards.

The control arm (10) has an elbow shape substantially fitting the elbow shape of the rear element (3).

Figure 3:
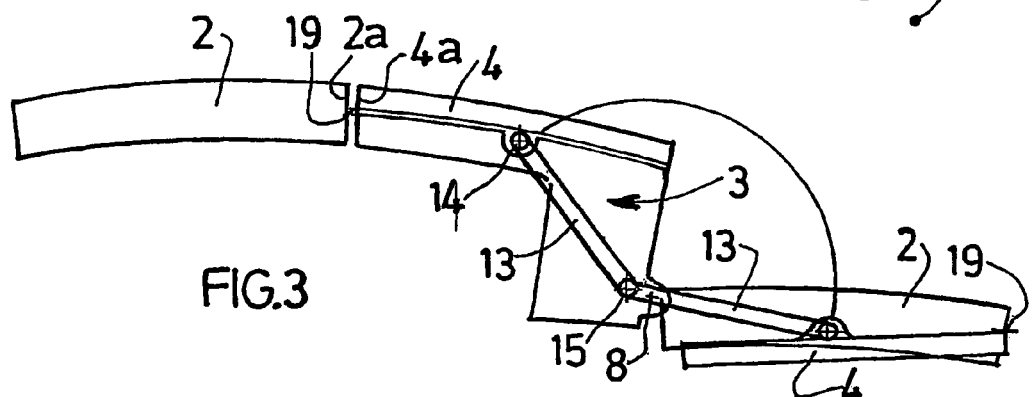
FIG. 3 is a view similar to FIG. 2, showing a first version of the means of moving the window of the rear element of the retractable roof.
Figure 5:
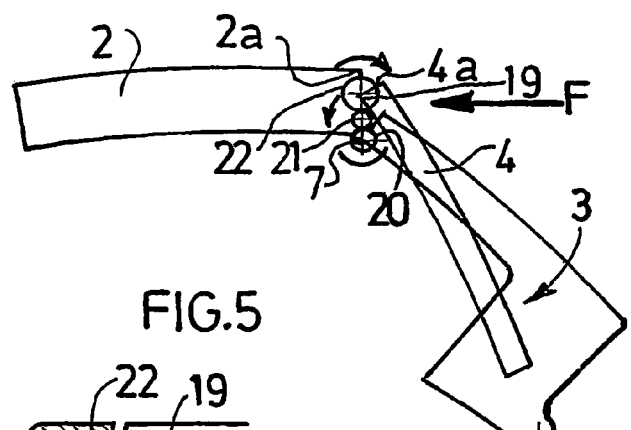
FIG. 5 is a view similar to FIGS. 3 and 4 showing a third version of the window movement means.
Figure 4:
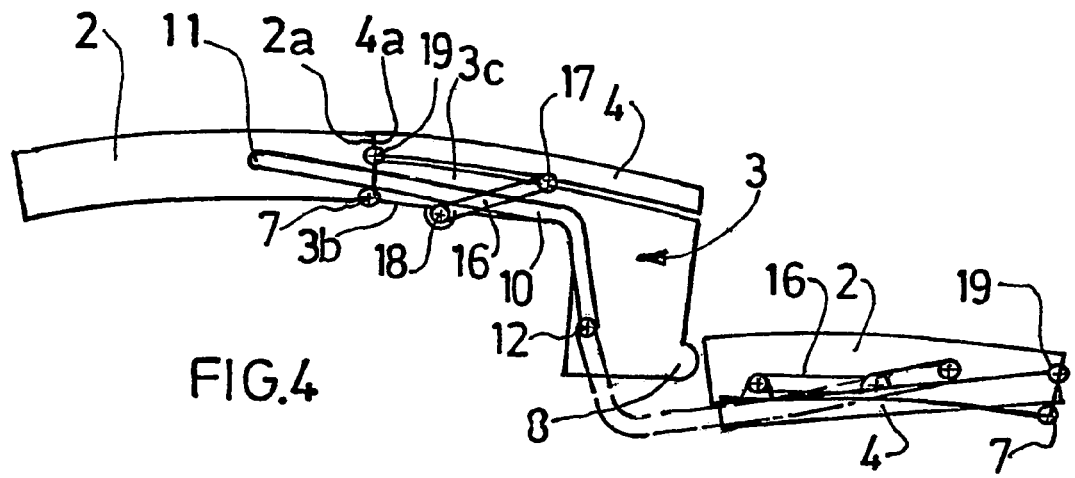
FIG. 4 is a view similar to FIG. 3 showing a second version of the window movement means.

As shown by FIGS. 3, 4 and 5, the rear window is associated with means making it possible to move this window (4) between a position in which it covers part of the external surface of the rear element (3) and a position stored in the rear luggage compartment (6) in which this window (4) extends between the front element (2) and the rear element (3).

This arrangement makes it possible to reduce the space requirement of the retractable roof inside the vehicle.

In the version of FIG. 3, the above means comprise a pivoting lever (13), one end of which is fixed so as to be articulated with the window (4) along an axis (14) extending under this window (4), and the other end of which is mounted able to pivot on the framework along an axis (15) close to said second axis (8).

FIG. 3 shows the pivoting of the lever (13) between its two extreme positions.

Moreover, the front edge (4a) of the window (4) is articulated with the rear edge (2a) of the front element (2) along an axis (19).

In the second version depicted in FIG. 4, the aforementioned means comprise a pivoting lever (16), one end of which is fixed so as to be articulated with the window (4) along an axis (17) extending under this window (4), and the other end of which is mounted able to pivot along an axis (18) integral with the pivoting arm (10).

Furthermore, the front edge (4a) of the window (4) is articulated with the rear edge (2a) of the front element (2) along an axis (19).

In the version according to FIG. 5, the front edge (4a) of the window (4) is articulated with the rear edge (2a) of the front element (2) and the axis of articulation (7) of the rear element (3) with the front element (2) carries a pinion (20) engaged with an idler pinion (21), itself engaged with a pinion (22) integral with the axis of articulation (19) of the window (4) with the front element (2).

Figure 6:
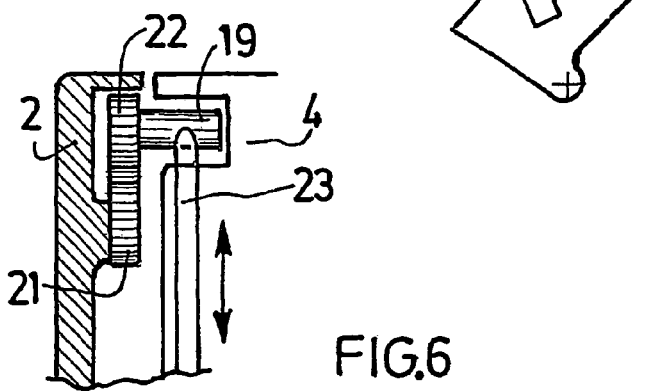
FIG. 6 is a detail view along the arrow F of FIG. 5.
Figure 7:
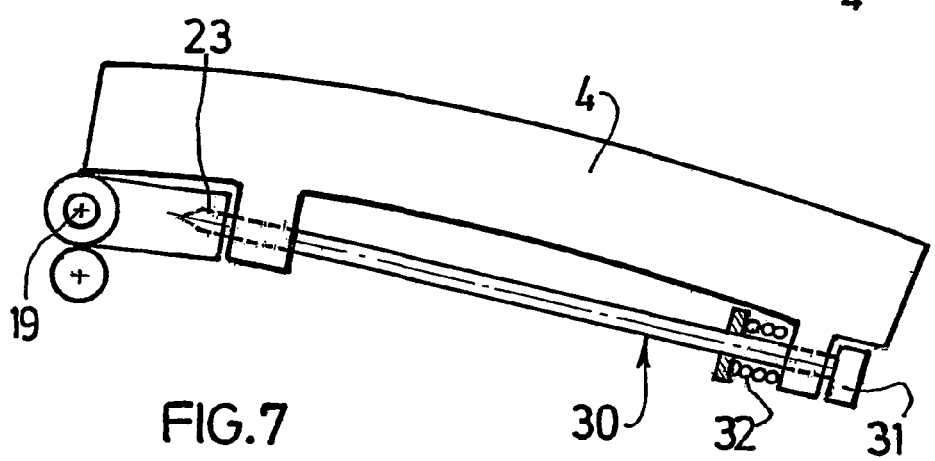
FIG. 7 is a side view of the rear window showing its locking device.
Figure 8:
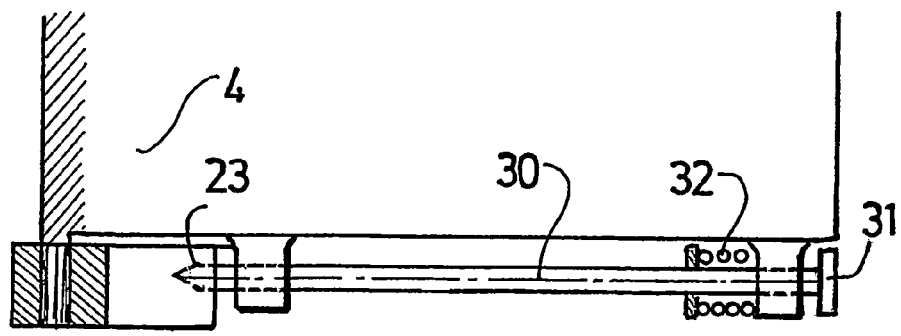
FIG. 8 is a partial plan view of the rear window, also showing its locking device.

Furthermore, as indicated in FIGS. 6, 7 and 8, the window (4) has a bolt (23) able to lock this window (4) at its axis of articulation (19) with the front element (2), by means of an arm (30), of which the end opposite to the bolt (23) carries a pull handle (31). The bolt (23) is held in the locking position by means of a spring (32).

The retractable roof which has just been described can suit any type of vehicle.

In the example of FIG. 1, the vehicle is of the pick-up type and comprises a front cab (5) forming a passenger compartment and a rear open body (6) forming a luggage compartment.

The cab (5) has front seats (24) and a rear bench seat (25) that can be folded down.

The roof according to the invention constituted by the front (2) and rear (3) elements described previously is movable between the following positions:

a first position in which the rear (3) and front (2) elements completely cover the front cab (5), it then being possible for the latter to give cover to passengers in the front and in the rear;

a second position in which the rear (3) and front (2) elements are stored in the rear open body (6), the front cab (5) then being totally uncovered;

a third position in which the rear bench seat (25) is folded down towards the front in the continuation of the floor (26) of the rear open body (6) in order to extend this, and the front element (2) of the roof covers the front part of the cab (5), the rear element (3) is stored in the rear open body (6), the window (4) of the rear element (3) is folded downwards and towards the front seats (24) in order to close off the rear of the cab (5).

FIG. 1 shows furthermore that the rear open body (6) has a swinging tailgate (27) and a luggage-hiding screen (28) mounted able to slide inside the tailgate (27) and along the upper edges (29) of the open body.

From the above description, it follows that the pick-up that has just been described is a multi-functional convertible vehicle, having simultaneously the advantages of a pick-up on account of the open body, of a saloon on account of the front and rear seats and a luggage compartment capable of being closed off, of a two-seater coupé with a rigid roof and of a two- or four-seater cabriolet.

What is claimed is:

1. A retractable roof for a vehicle, comprising:
a rigid front roof element (2) and a rigid rear roof element (3) having a rear window (4), said roof elements having roof elements moving means for moving the roof elements between a first position in which the roof elements (2, 3) extend above the passenger compartment (5) of the vehicle, and a second position in which the elements (2, 3) are folded one on top of the other in a rear luggage compartment (6) of the vehicle;
the roof element moving means characterised in that the front roof element (2) is articulated with the rear element (3) along a first axis (7) defined between the adjacent edges of the elements (2, 3), the rear element (3) being articulated with respect to the vehicle body along a second axis (8), the movement of the roof elements (2, 3) between the first and second positions is controlled by a pivoting control arm (10), a front end of which is articulated with respect to the front roof element (2) along a third axis (11) situated forwardly of the first axis (7), a rear end of said control arm (10) being articulated with respect to the vehicle body along a fourth axis (12) situated forwardly of the second axis (8), the four axes (7, 8, 11, 12) defining a deformable quadrilateral, rotation of control arm (10), resulting in the deformation of the quadrilateral formed by axes (7, 8, 11 and 12) such that the front and rear roof elements will be articulated by being transported and rotated between the first and the second positions with the direction depending upon the direction of rotation of the control arm.

2. The roof according to claim 1, characterised in that the pivoting of said arm (10) is controlled by means allowing this arm (10) to swing towards the rear through an angle close to 180°.

3. The roof according to claim 1, characterised in that, in the position of storage in the rear luggage compartment (6), the front element (2) extends substantially horizontally above the rear element (3), the latter being folded under the front element (2) by rotation through an angle close to 180° around said first axis (7).

4. The roof according to claim 1, characterised in that the rear window (4) is associated with means making it possible to move this window between a position in which it covers part of the external surface of the rear element (3) and a position stored in the rear luggage compartment (6) in which this window (4) extends between the front element (2) and the rear element (3).

5. The roof according to claim 4, characterised in that said means comprise a pivoting lever (13), one end of which is fixed so as to be articulated with the window (4) along an axis (14) extending under this window (4), and the other end of which is mounted able to pivot along an axis (15) fixed to the framework close to said second axis (8).

6. A vehicle equipped with a retractable roof according to claim 1, this vehicle (1) being of the pick-up type comprising a front cab (5) and a rear open body (6), this cab (5) having front seats (24) and a rear bench seat that can be folded down, the roof (2, 3) being movable between the following positions:
- a first position in which the rear (3) and front (2) elements completely cover the front cab (5), the latter then being able to give cover to passengers in the front and in the rear;
- a second position in which the rear (3) and front (2) elements are stored in the rear open body (6), the front cab (5) then being totally uncovered;
- a third position in which the rear bench seat (25) is folded down towards the front in the continuation of the floor (26) of the rear open body (6) in order to extend this, and the front element (2) covers the front part of the cab (5), the rear element (3) is stored in the rear open body (6), the window (4) of the rear element (3) is folded downwards and towards the front seats (24) in order to close off the rear of the cab (5).

7. Apparatus as in claim 1 having pivoting arm power means for powering the movement of pivot arm and the front and rear roof elements between the first and second positions.

* * * * *